(12) United States Patent
Byun et al.

(10) Patent No.: US 10,205,154 B2
(45) Date of Patent: Feb. 12, 2019

(54) RECHARGEABLE BATTERY HAVING SHORT-CIRCUIT PROTRUSION

(71) Applicant: SAMSUNG SDI CO., LTD., Yongin-si, Gyeonggi-do (KR)

(72) Inventors: Sang-Won Byun, Yongin-si (KR); Seok-Yoon Yoo, Yongin-si (KR); Chi-Young Lee, Yongin-si (KR); Kwan-Hyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 175 days.

(21) Appl. No.: 14/732,484

(22) Filed: Jun. 5, 2015

(65) Prior Publication Data

US 2016/0043379 A1  Feb. 11, 2016

(30) Foreign Application Priority Data

Aug. 8, 2014 (KR) .................. 10-2014-0102612

(51) Int. Cl.
*H01M 2/04* (2006.01)
*H01M 2/34* (2006.01)

(52) U.S. Cl.
CPC ......... *H01M 2/345* (2013.01); *H01M 2/0486* (2013.01); *H01M 2200/20* (2013.01)

(58) Field of Classification Search
CPC ...... H01M 2/345; H01M 2/0217; H01M 2/04; H01M 2/043; H01M 2/0473; H01M 2/0486; H01M 2/34; H01M 2/348; H01M 10/42; H01M 10/425; H01M 2200/20
See application file for complete search history.

(56) References Cited

U.S. PATENT DOCUMENTS

| | | | |
|---|---|---|---|
| 2011/0183197 A1* | 7/2011 | Byun | ............... H01M 2/04 429/185 |
| 2012/0183818 A1* | 7/2012 | Byun | ............ H01M 2/0473 429/61 |
| 2012/0237802 A1* | 9/2012 | Byun | ............... H01M 2/043 429/53 |
| 2013/0059170 A1 | 3/2013 | Kim | |
| 2014/0141319 A1 | 5/2014 | Kim et al. | |

FOREIGN PATENT DOCUMENTS

| | | |
|---|---|---|
| CN | 102136562 A | 7/2011 |
| CN | 102683760 A | 9/2012 |
| CN | 103840120 A | 6/2014 |
| JP | 2013-235814 | 11/2013 |
| KR | 10-2013-0026971 | 3/2013 |

* cited by examiner

*Primary Examiner* — Eugenia Wang
(74) *Attorney, Agent, or Firm* — Lewis Roca Rothgerber Christie LLP

(57) ABSTRACT

A rechargeable battery includes: an electrode assembly including a first electrode and a second electrode; a case accommodating the electrode assembly; a first terminal electrically coupled to the first electrode, and a second terminal electrically coupled to the second electrode; a cap plate combined to the case and having a short-circuit hole formed therein; a membrane fixed to the cap plate and arranged in the short-circuit hole, the membrane being deformable to short-circuit the first electrode and the second electrode; and a short-circuit protrusion electrically coupled to the second electrode and arranged above the membrane to protrude theretoward, the short-circuit protrusion being arranged toward a side from a center of the short-circuit hole.

13 Claims, 9 Drawing Sheets

RECHARGEABLE BATTERY HAVING SHORT-CIRCUIT PROTRUSION

CROSS-REFERENCE TO RELATED APPLICATION

This application claims priority to and the benefit of Korean Patent Application No. 10-2014-0102612, filed on Aug. 8, 2014 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery differs from a primary battery in that it can be repeatedly charged and discharged, while the latter is incapable of being recharged.

A low-capacity rechargeable battery is commonly used in small portable electronic devices such as mobile phones, notebook computers, and camcorders, while a high-capacity rechargeable battery can be widely used as a power source for driving a motor of hybrid vehicles, electric vehicles, and the like.

Recently, a high-power rechargeable battery using a non-aqueous electrolyte and having high energy density has been developed, and the high-power rechargeable battery consists of a large-capacity rechargeable battery in which a plurality of rechargeable batteries are connected in series, such that it can be used as a power source for driving a motor of a device requiring a large amount of electric power, such as a hybrid vehicle, an electric vehicle, or the like.

In addition, a high-capacity rechargeable battery generally includes a plurality of rechargeable batteries connected in series, and the rechargeable battery may have a cylindrical shape, a prismatic shape, etc.

When an internal pressure of the rechargeable battery, of which a case is made of a metal, etc., is increased by an abnormal reaction, the case should be opened, and charging and discharging operations need to be disabled.

In order to disable the charging and discharging operations, a short circuit should be induced to discharge a charged current.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a rechargeable battery is capable of inducing and maintaining a short circuit state when a danger occurs and thus stably discharging a charged current. According to an aspect of embodiments of the present invention, a rechargeable battery has a short-circuit protrusion.

According to one or more exemplary embodiments of the present invention, a rechargeable battery includes: an electrode assembly including a first electrode and a second electrode; a case accommodating the electrode assembly; a first terminal electrically coupled to the first electrode, and a second terminal electrically coupled to the second electrode; a cap plate combined to the case and having a short-circuit hole formed therein; a membrane fixed to the cap plate and arranged in the short-circuit hole, the membrane being deformable to short-circuit the first electrode and the second electrode; and a short-circuit protrusion electrically coupled to the second electrode and arranged above the membrane to protrude theretoward, the short-circuit protrusion being arranged toward a side from a center of the short-circuit hole.

The short-circuit protrusion may be disposed above the short-circuit hole. The short-circuit protrusion may be arranged to be shifted from the center of the short-circuit hole and to be adjacent to a connection terminal that is inserted into the second terminal.

The short-circuit protrusion may be arranged between the center of the short-circuit hole and a connection terminal that is inserted into the second terminal, and the short-circuit protrusion may be elongated in an arc shape.

A cross section of the short-circuit protrusion may have a semi-circular shape, and a groove having an arc-shaped cross-section may be formed at a bottom surface of the short-circuit protrusion.

The short-circuit protrusion may be protrude from a bottom surface of the second terminal.

The short-circuit protrusion may include an inclined portion slantedly formed at a lower end of the short-circuit protrusion.

The rechargeable battery may further include a connection plate arranged under the second terminal, and the short-circuit protrusion may protrude from the connection plate. The connection plate may include a cylindrical portion protruding toward the membrane and having a tubular shape, and the short-circuit protrusion may protrude from a lower end of the cylindrical portion.

The rechargeable battery may further include a cap inserted into the cylindrical portion. The rechargeable battery may further include an upper insulating member arranged between the connection plate and the cap plate, and the upper insulating member may enclose sides of the connection plate.

According to an aspect of embodiments of the present invention, resistance between the membrane and the short-circuit protrusion is decreased to maintain the short circuit state, thereby stably discharging a charged current.

Figure 1:
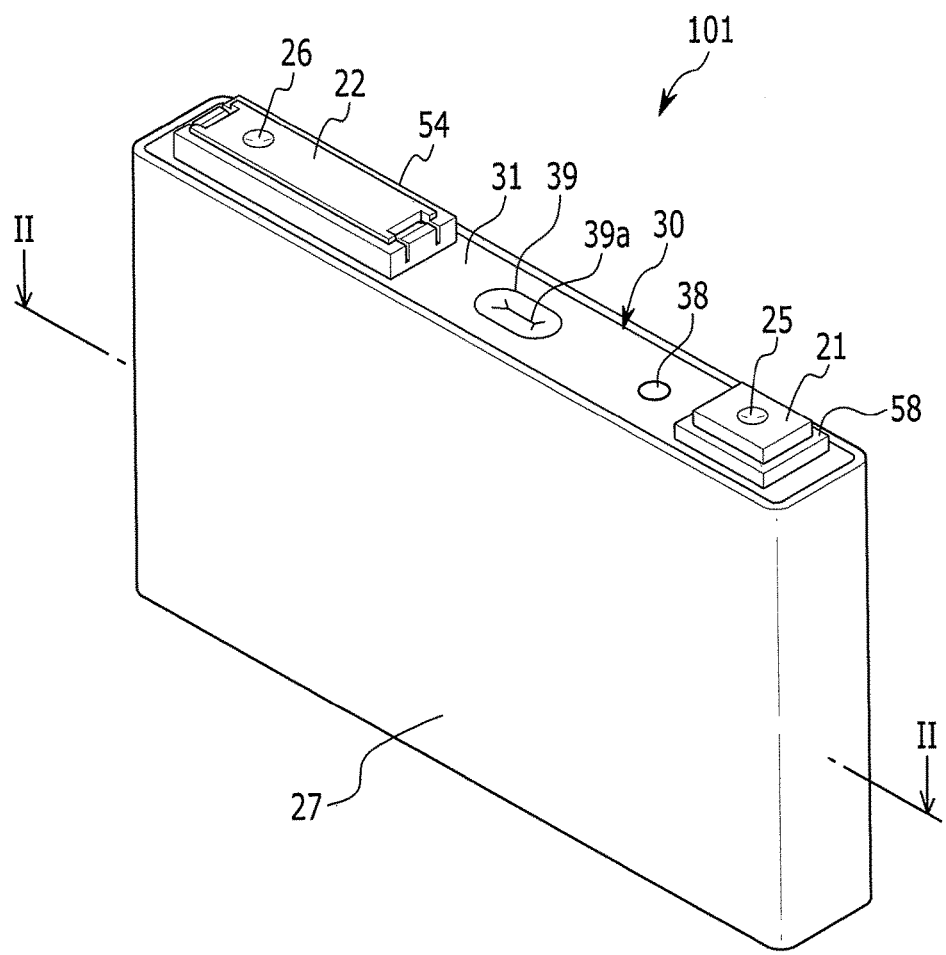
FIG. 1 is a perspective view of a rechargeable battery according to an exemplary embodiment of the present invention.

Description of Reference Numerals Indicating
Some Elements in the Drawings

| | |
|---|---|
| 101: rechargeable battery | 10: electrode assembly |
| 11: first electrode | 11a: first electrode uncoated region |
| 12: second electrode | 12a: second electrode uncoated region |
| 13: separator | 21, 71: first terminal |
| 22, 62, 72: second terminal | 22a, 64a, 67a, 86: terminal hole |
| 22b, 64b, 67b, 84: short-circuit protrusion | 25, 26, 73, 75: connection terminal |
| 26: connection terminal | 27: case |
| 30: cap assembly | 31: cap plate |
| 37: short-circuit hole | 41: first current collecting member |
| 42: second current collecting member | 43, 45: lower insulating member |
| 54, 65, 74: upper insulating member | 55, 59: sealing gasket |
| 56: membrane | 58: connection member |
| 63: cover plate | 64, 67, 80: connection plate |
| 64c: inclined portion | 78: cap |
| 81: plate portion | 82: cylindrical portion |
| 83: bottom | 85: through-hole |

DETAILED DESCRIPTION

The present invention will be described more fully hereinafter with reference to the accompanying drawings, in which some exemplary embodiments of the invention are shown.

As those skilled in the art would realize, the described embodiments may be modified in various different ways, all without departing from the spirit or scope of the present invention. Accordingly, the drawings and description are to be regarded as illustrative in nature and not restrictive.

Like reference numerals designate like elements throughout the specification and the drawings.

Figure 2:
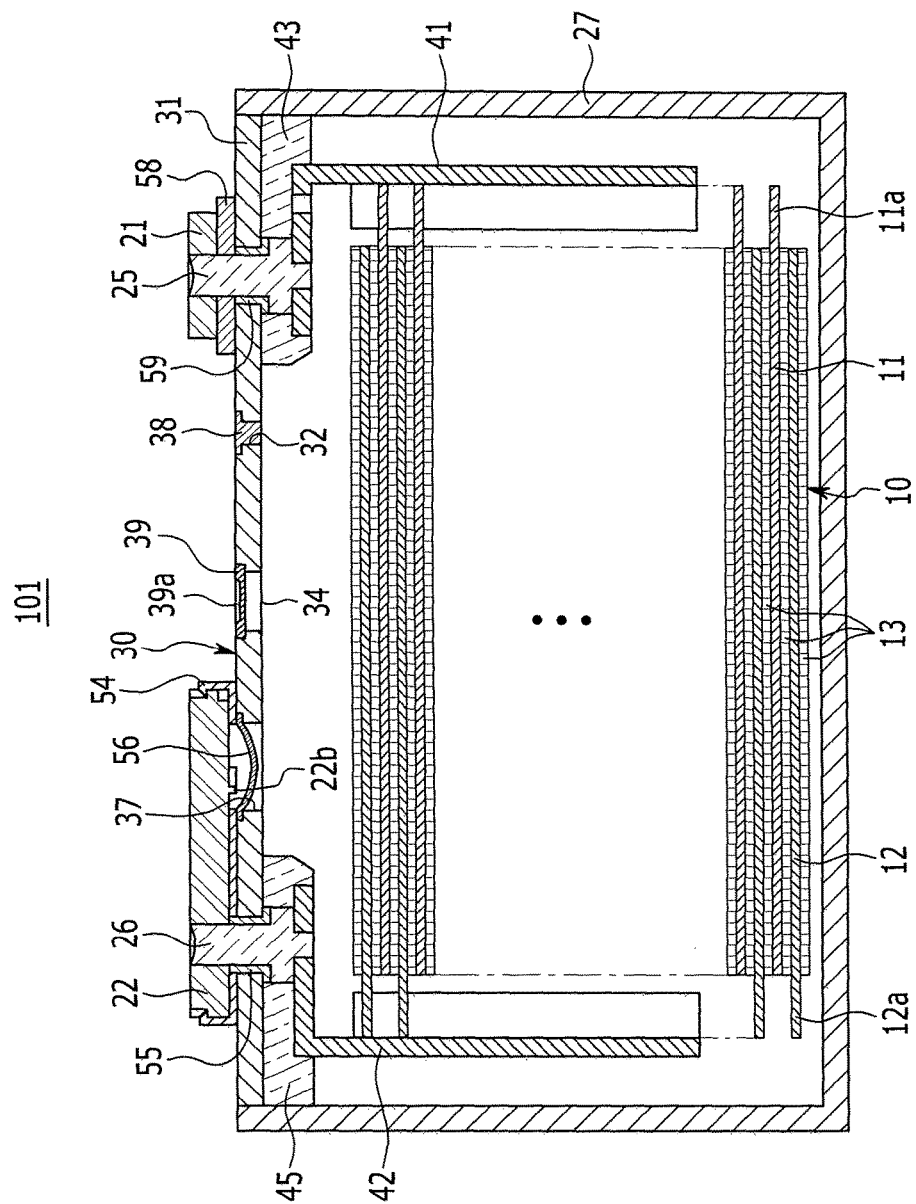
FIG. 2 is a cross-sectional view of the rechargeable battery of FIG. 1, taken along the line II-II.

FIG. 1 is a perspective view of a rechargeable battery according to an exemplary embodiment of the present invention; and FIG. 2 is a cross-sectional view of the rechargeable battery of FIG. 1, taken along the line II-II.

Referring to FIGS. 1 and 2, a rechargeable battery 101 according to an exemplary embodiment of the present invention includes an electrode assembly 10 formed (e.g., by winding) with a first electrode (e.g., a positive electrode) 11 and a second electrode (e.g., a negative electrode) 12, and a separator 13 interposed therebetween, a case 27 for accommodating the electrode assembly 10, and a cap assembly 30 combined to an opening of the case 27.

The rechargeable battery 101 according to one embodiment is illustrated as a prism-shaped lithium ion rechargeable battery. However, the present invention is not limited thereto, and the present invention may be applied to various types of batteries such as a lithium polymer battery, a cylindrical battery, etc.

The positive electrode 11 and the negative electrode 12 include coated regions where an active material is coated on a current collector formed of a thin metal foil, and uncoated regions 11a and 12a where the active material is not coated thereon.

In one embodiment, the positive electrode uncoated region 11a is formed at one lateral end of the positive electrode 11 along a length direction of the electrode assembly 10, and the negative electrode uncoated region 12a is formed at the other lateral end of the negative electrode 12 along a length direction of the electrode assembly 10.

In one embodiment, the positive electrode 11 and the negative electrode 12 are wound while interposing the separator 13 as an insulator therebetween.

However, the present invention is not limited thereto, and, in another embodiment, the electrode assembly 10 may be formed in a layered structure in which the negative electrode 12 and the positive electrode 11, respectively formed of a plurality of sheets, are layered while interposing the separator 13 therebetween.

The case 27, in one embodiment, is substantially formed as a cuboid, and one side thereof is formed with an opening.

The case 27 may be formed of a metal, such as aluminum, stainless steel, etc., for example.

The cap assembly 30 includes a cap plate 31 that covers the opening of the case 27, a first terminal 21 that protrudes out of the cap plate 31 to be electrically coupled to the positive electrode 11, and a second terminal 22 that protrudes out of the cap plate 31 to be electrically coupled to the negative electrode 12.

The cap plate 31 is formed as a plate elongated in a direction such that it is combined to the opening of the case 27.

The cap plate 31, in one embodiment, is provided with a sealing cap 38 that is inserted in an electrolyte injection opening 32, and a vent plate 39 that is provided in a vent hole 34 to be opened at a reference pressure (e.g., a predetermined pressure) and that is formed with a notch 39a.

The first and second terminals 21 and 22 are installed to protrude above the cap plate 31.

The first terminal 21 is electrically coupled to the positive electrode 11 through a first current collecting member 41, and the second terminal 22 is electrically coupled to the negative electrode 12 through a second current collecting member 42.

However, the present invention is not limited thereto, and, in another embodiment, the first terminal 21 may be electrically coupled to the negative electrode, while the second terminal 22 may be electrically coupled to the positive electrode.

The first terminal 21, in one embodiment, has a rectangular or generally rectangular plate shape. The first terminal 21 is electrically coupled to the positive electrode 11 through a connection terminal 25 that is bonded or coupled to the first current collecting member 41.

The connection terminal 25 combined to the first terminal 21 and a connection terminal 26 combined to the second terminal 22 may have a same or substantially same structure.

A sealing gasket 59 for sealing is installed between the connection terminal 25 and the cap plate 31 to be inserted into a hole of the cap plate 31 through which the connection terminal 25 penetrates, and a lower insulating member 43 is provided under the cap plate 31 to support the first current collecting member 41.

A connection member 58 is installed between the first terminal 21 and the cap plate 31 to electrically connect the first terminal 21 with the cap plate 31.

Accordingly, in one embodiment, the cap plate 31 and the case 27 are positively charged.

The second terminal 22, in one embodiment, has a cuboid or generally cuboid shape.

The second terminal 22 is electrically coupled to the negative electrode 12 through the connection terminal 26 that is bonded or coupled to the second current collecting member 42.

The connection terminal 26 penetrates the cap plate 31 and the second terminal 22 such that an upper portion of the connection terminal 26 is fixed to the second terminal 22.

A sealing gasket 55 for sealing is provided between the connection terminal 26 and the cap plate 31 to be inserted into a hole of the cap plate 31 through which the connection terminal 26 penetrates, and a lower insulating member 45 is provided under the cap plate 31 to insulate the cap plate 31 from the second current collecting member 42.

The second terminal 22 is formed to be elongated in a direction so as to cover a short-circuit hole 37 formed in the cap plate 31.

An upper insulating member 54 is installed between the second terminal 22 and the cap plate 31 to electrically insulate the second terminal 22 from the cap plate 31.

The cap assembly 30 includes a membrane 56 for short-circuiting the positive electrode 11 with the negative electrode 12, and the membrane 56 is electrically coupled to the cap plate 31 and is deformable to be coupled to the second terminal 22 when an internal pressure of the rechargeable battery 101 increases.

The short-circuit hole 37 is formed in the cap plate 31, and the membrane 56 is disposed between the upper insulating member 54 and the cap plate 31 at the short-circuit hole 37.

The membrane 56 includes a curved portion that is downwardly convex in an arc shape in a normal operating condition, and an edge portion that is formed at end portions of the curved portion to be fixed to the cap plate 31.

When a gas is generated due to an abnormal reaction in the rechargeable battery 101, the internal pressure of the rechargeable battery 101 increases.

When the internal pressure of the rechargeable battery 101 exceeds a reference pressure (e.g., a predetermined pressure), the curved portion of the membrane 56 is deformed to be upwardly convex, and, in this case, a short-circuit protrusion 22b of the second terminal 22 and the membrane 56 contact each other to cause a short circuit.

Figure 3:
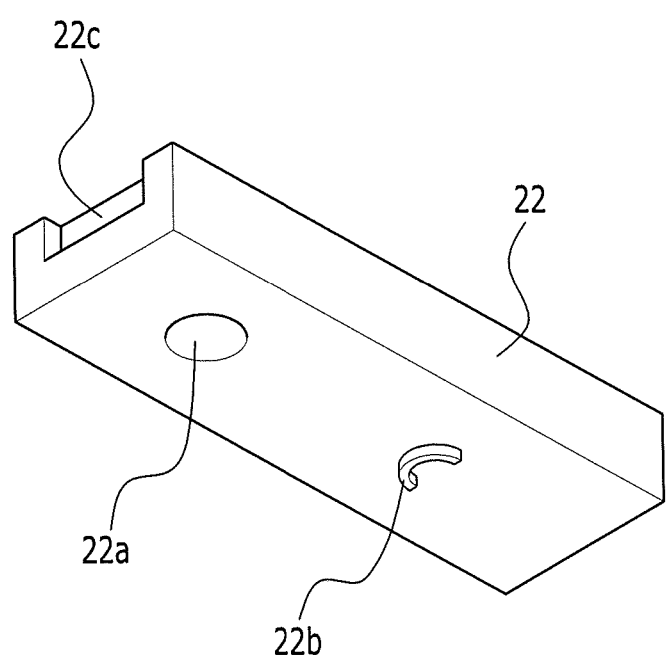
FIG. 3 is a perspective view of a second terminal of the rechargeable battery of FIG. 1, viewed from the bottom.
Figure 4:
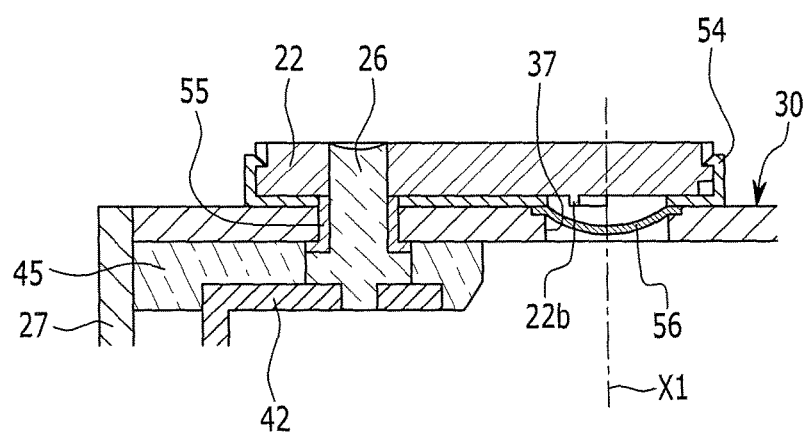
FIG. 4 is a partial cross-sectional view of the rechargeable battery of FIG. 1.

As shown in FIGS. 3 and 4, the second terminal 22 is formed with a terminal hole 22a into which the connection terminal 26 is inserted, and the short-circuit protrusion 22b protruding toward the short-circuit hole 37.

The connection terminal 26, in one embodiment, is fixed by riveting to the second terminal 22 at an upper end of the terminal hole 22a.

In one embodiment, a groove 22c into which a catching protrusion formed in the upper insulating member 54 is inserted is formed at opposite lateral sides of the second terminal 22.

The short-circuit protrusion 22b protrudes toward the membrane 56 from a bottom surface of the second terminal 22 and is formed to be elongated in an arc shape.

A cross section of the short-circuit protrusion 22b may have a substantially semi-circular shape.

The short-circuit protrusion 22b is disposed to be shifted toward one side from a center X1 of the short-circuit hole 37 such that it is adjacent or at the side of the center X1 nearer to the connection terminal 26.

The short-circuit protrusion 22b is disposed between the center X1 of the short-circuit hole 37 and the connection terminal 26.

When the short-circuit protrusion 22b is disposed to be shifted as such, the short-circuit protrusion 22b and the membrane 56 contact each other at a position where the short-circuit protrusion 22b and the membrane 56 are adjacent or at the side of the center X1 nearer to the connection terminal 26 when the membrane 56 is inversely deformed.

The short-circuit current flows to the connection terminal 26 from the membrane 56 by way of the short-circuit protrusion 22b and the second terminal 22. In a case where the short-circuit protrusion 22b is disposed further away from the connection terminal 26, a current path increases in its length and thus a relatively great amount of heat is generated.

Since a large amount of current flows in a short period of time when the short circuit occurs, even a small difference in resistance may cause a large difference in the generated heat.

When much heat is generated, the short-circuit protrusion 22b or membrane 56 is melted to halt a short circuit state such that an unstable state is maintained.

Thus, it is very crucial to maintain the short circuit state by decreasing the generated heat.

Therefore, in the present exemplary embodiment, the short-circuit protrusion 22b is disposed to be shifted toward the connection terminal 26, such that the path of the short-circuit current decreases in length and thus the generated heat is reduced, thereby maintaining the short circuit state.

Figure 5:
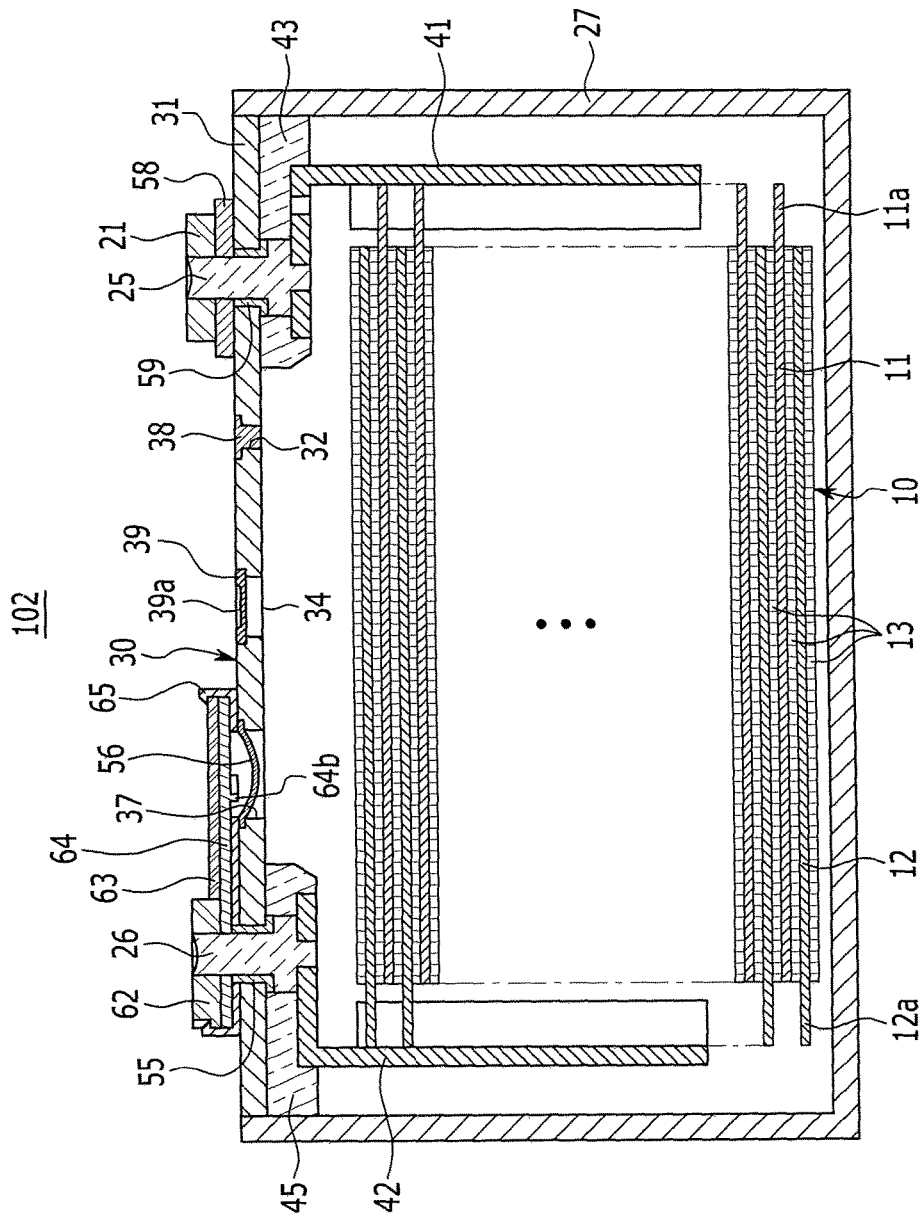
FIG. 5 is a vertical cross-sectional view of a rechargeable battery according to another exemplary embodiment of the present invention.

FIG. 5 is a vertical cross-sectional view of a rechargeable battery according to another exemplary embodiment of the present invention.

Referring to FIG. 5, a rechargeable battery 102 according to another exemplary embodiment of the present invention has a same structure as the rechargeable battery 101 according to the aforementioned exemplary embodiment, except for a second terminal 62 and a connection plate 64, and, therefore, description of the same structures will not be repeated herein.

The second terminal 62, in one embodiment, has a cuboid or generally cuboid shape.

The second terminal 62 is electrically coupled to the negative electrode 12 through the connection terminal 26 that is bonded or coupled to the second current collecting member 42.

The connection terminal 26 penetrates the cap plate 31 and the second terminal 62 such that an upper end of the connection terminal 26 is fixed to the second terminal 62.

The connection plate 64 includes a portion disposed under the second terminal 62, and the connection plate 64 is disposed to be elongated from the portion under the second terminal 62 to another portion above the short-circuit hole 37.

A cover plate 63 is installed above the connection plate 64 such that a lateral end of the cover plate 63 contacts the second terminal 62, and an upper insulating member 65 is installed between the connection plate 64 and the cap plate 31 to insulate the connection plate 64 from the cap plate 31.

Figure 6:
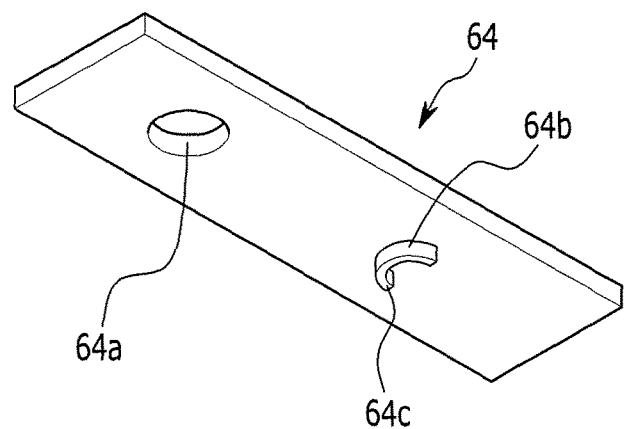
FIG. 6 is a perspective view of a connection plate of the rechargeable battery of FIG. 5, viewed from the bottom.
Figure 7:
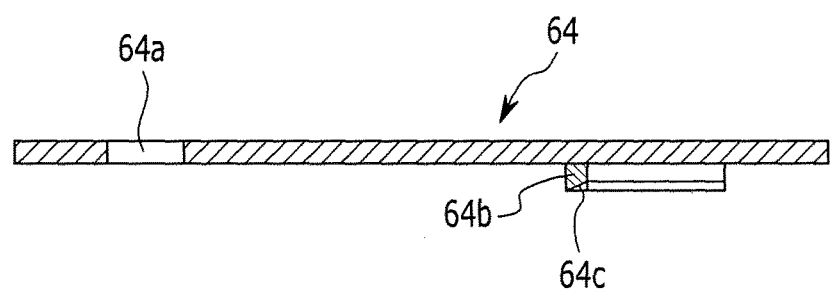
FIG. 7 is a vertical cross-sectional view of the connection plate of FIG. 6.

FIG. 6 is a perspective view of the connection plate 64, viewed from the bottom; and FIG. 7 is a vertical cross-sectional view of the connection plate 64.

Referring to FIGS. 6 and 7, in one embodiment, the connection plate 64 is electrically coupled to the second terminal 62 to be negatively charged.

A terminal hole 64a into which the connection terminal 26 is inserted is formed in the connection plate 64, and a short-circuit protrusion 64b protruding toward the membrane 56 is formed at a bottom surface of the connection plate 64.

The short-circuit protrusion 64b is disposed to be shifted toward one side from the center of the short-circuit hole 37 such that it is adjacent or at the side of the center of the short-circuit hole 37 nearer to the connection terminal 26.

The short-circuit protrusion 64b is disposed between the center of the short-circuit hole 37 and the connection terminal 26.

The short-circuit protrusion 64b protrudes toward the membrane 56 from the bottom surface of the connection plate 64 and is formed to be elongated in an arc shape.

A cross section of the short-circuit protrusion 64b may have a substantially semi-circular shape.

An inclined portion 64c is slantedly formed at a bottom surface of the short-circuit protrusion 64b with respect to the connection plate 64.

Figure 8:
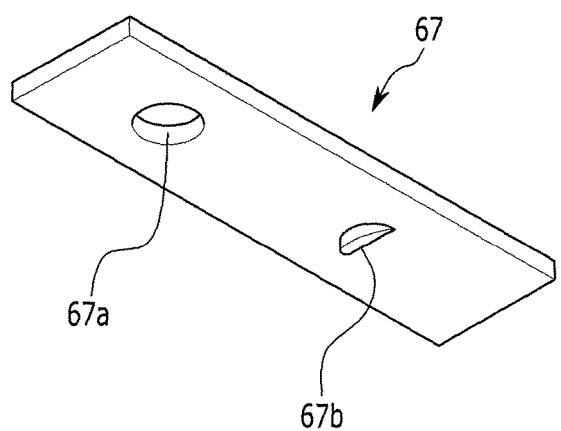
FIG. 8 is a perspective view of a connection plate of a rechargeable battery according to another exemplary embodiment of the present invention, viewed from the bottom.
Figure 9:
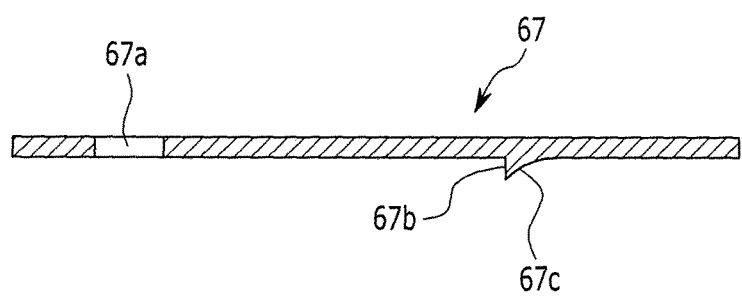
FIG. 9 is a vertical cross-sectional view of the connection plate of FIG. 8.

FIG. 8 is a perspective view of a connection plate 67 of a rechargeable battery according to another exemplary embodiment of the present invention, viewed from the bottom, and FIG. 9 is a vertical cross-sectional view of the connection plate 67.

Referring to FIGS. 8 and 9, a rechargeable battery according to another exemplary embodiment of the present invention has a same structure as the rechargeable battery 102 according to the aforementioned exemplary embodiment, except for the connection plate 67, and, therefore, description of the same structures will not be repeated herein.

The connection plate 67 includes a portion disposed under the second terminal 62, and, in one embodiment, is electrically coupled to the second terminal 62 to be negatively charged.

A terminal hole 67a into which the connection terminal 26 is inserted is formed in the connection plate 67, and a short-circuit protrusion 67b protruding toward the membrane 56 is formed at a bottom surface of the connection plate 67.

The short-circuit protrusion 67b is disposed to be shifted toward one side from the center of the short-circuit hole 37 such that it is adjacent or at the side of the center of the short-circuit hole 37 nearer to the connection terminal 26.

The short-circuit protrusion 67b is disposed between the center of the short-circuit hole 37 and the connection terminal 26.

The short-circuit protrusion 67b protrudes toward the membrane 56 from the bottom surface of the connection plate 67, and a cross section of the short-circuit protrusion 67b may have a substantially semi-circular shape.

In addition, a groove 67c is slantedly formed at a bottom surface of the short-circuit protrusion 67b.

As such, when the groove 67c having an arc-shaped cross section is formed at the bottom surface of the short-circuit protrusion 67b, a contact area between the membrane 56 and the short-circuit protrusion 67b increases and, thus, resistance therebetween is decreased.

Figure 10:
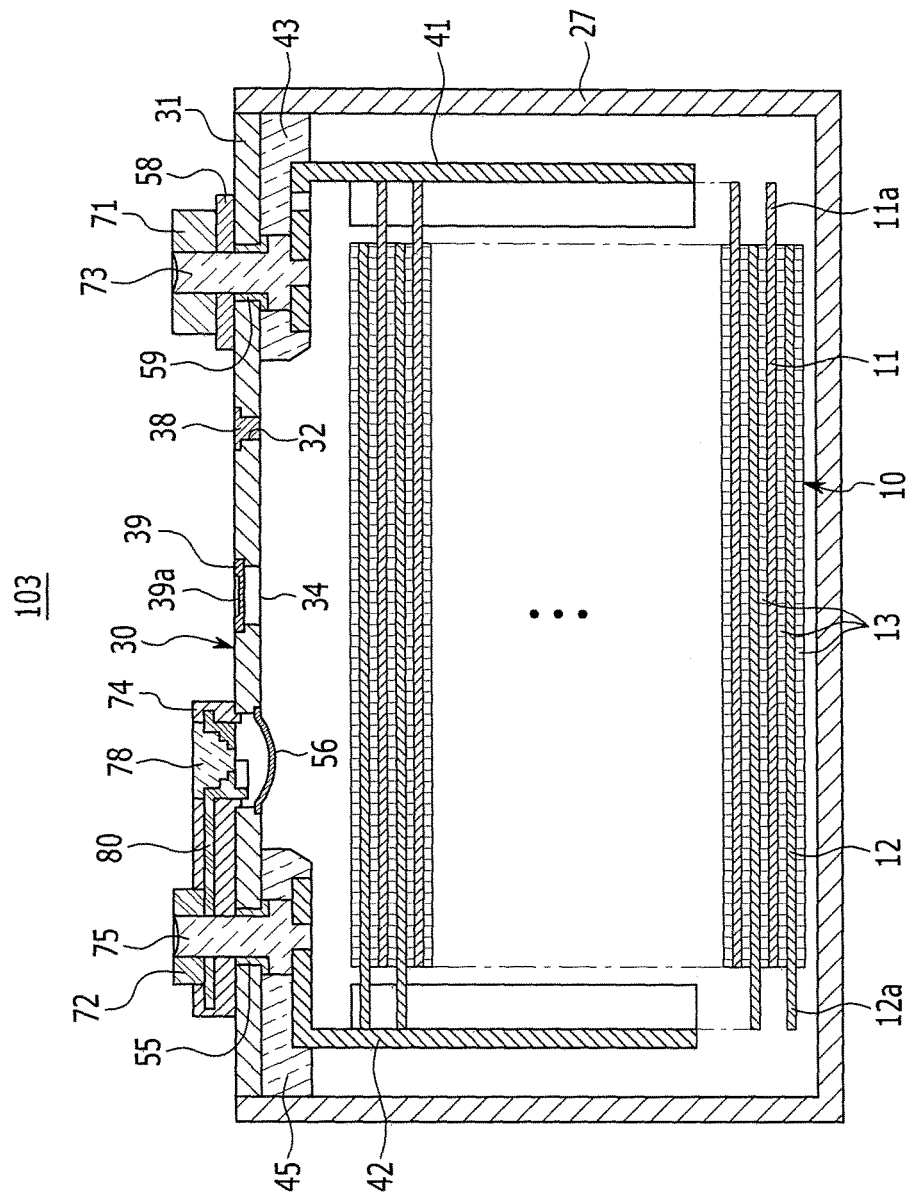
FIG. 10 is a vertical cross-sectional view of a rechargeable battery according to another exemplary embodiment of the present invention.
Figure 11:
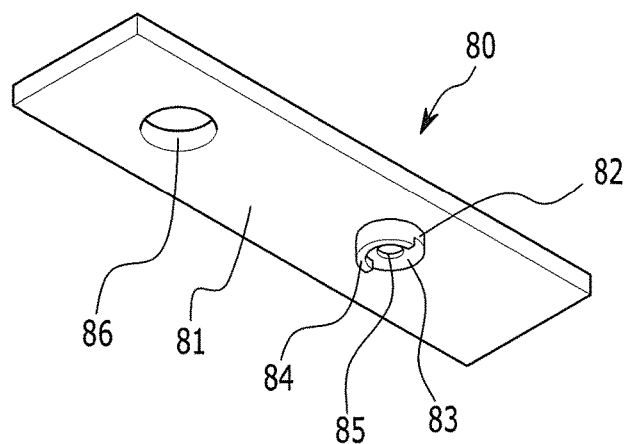
FIG. 11 is a perspective view of a connection plate of the rechargeable battery of FIG. 10, viewed from the bottom.

FIG. 10 is a vertical cross-sectional view of a rechargeable battery according to another exemplary embodiment of the present invention; and FIG. 11 is a perspective view of a connection plate of the rechargeable battery of FIG. 10, viewed from the bottom.

Referring to FIGS. 10 and 11, a rechargeable battery 103 according to another exemplary embodiment has a structure that is the same or similar to that of the rechargeable battery 102 according to the aforementioned exemplary embodiment, except for a connection plate 80 and a cap 78, and, therefore, description of the same structures will not be repeated herein.

A first terminal 71 of the rechargeable battery 103 has a cuboid or generally cuboid shape and is electrically coupled to the first current collecting member 41 through a connection terminal 73 having a pillar shape.

The connection member 58 is installed under the first terminal 71 to electrically connect the first terminal 71 with the cap plate 31.

A second terminal 72 of the rechargeable battery 103 has a cuboid or generally cuboid shape and is electrically coupled to the negative electrode 12 through a connection terminal 75 that is bonded or coupled to the second current collecting member 42.

The connection terminal 75 penetrates the cap plate 31 and the second terminal 72 such that an upper end of the connection terminal 75 is fixed to the second terminal 72.

The connection plate 80 includes a portion disposed under the second terminal 72, and the connection plate 80 is disposed to be elongated from the portion under the second terminal 72 to a portion above the short-circuit hole 37.

The connection plate is disposed above the membrane 56 to be separated therefrom in a normal operating condition, and an upper insulating member 74 is installed between the connection plate 80 and the cap plate 31 to insulate the connection plate 80 from the cap plate 31.

The connection plate 80 includes a plate portion 81 that contacts a bottom surface of the second terminal 72 to be coupled thereto, and a cylindrical portion 82 that protrudes toward the membrane 56 from the plate portion 81.

In addition, a terminal hole 86 into which the connection terminal 75 is inserted is formed in the connection plate 80.

A bottom 83 traversing the cylindrical portion 82 is formed at a bottom of the cylindrical portion 82, and a through-hole 85 is formed at the bottom 83.

The cap 78 is inserted on top of the cylindrical portion 82, and the cap 78 prevents or substantially prevents water from being introduced into the cylindrical portion 82 and also allows air to be discharged outside from inside of the cylindrical portion 82.

A short-circuit protrusion 84 protruding downwardly toward the membrane 56 is formed at a lower end of the cylindrical portion 82, and the short-circuit protrusion 84 downwardly protrudes from an external circumferential surface of the cylindrical portion 82.

The short-circuit protrusion 84 is disposed to be shifted toward one side from the center of the short-circuit hole 37 such that it is adjacent or at the side of the center of the short-circuit hole 37 nearer to the connection terminal 75.

The short-circuit protrusion 84 is disposed between the center of the short-circuit hole 37 and the connection terminal 75.

The short-circuit protrusion 84 protrudes toward the membrane 56 from a bottom surface of the connection plate 80, and is formed to be elongated in an arc shape.

A cross section of the short-circuit protrusion 84 may have a substantially semi-circular shape.

While the present invention has been described in connection with some exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
    an electrode assembly including a first electrode and a second electrode;
    a case accommodating the electrode assembly;
    a first terminal electrically coupled to the first electrode, and a second terminal electrically coupled to the second electrode;
    a cap plate combined to the case and having a short-circuit hole formed therein;

a membrane fixed to the cap plate and arranged in the short-circuit hole, the membrane being deformable from a normal state in which the membrane is electrically coupled to the first electrode to a deformed state to electrically connect to the second terminal and short-circuit the first electrode and the second electrode;

a connection terminal penetrating the cap plate at a first location and coupled to the second terminal; and a short-circuit protrusion electrically coupled to the second electrode when the membrane is in the normal state and arranged above the membrane to protrude theretoward, the short-circuit protrusion being entirely spaced apart from the cap plate, wherein the short-circuit protrusion is asymmetrically arranged about a center axis of the short-circuit hole and is offset toward a side from the center axis of the short-circuit hole that is nearer to the first location, and an entire contact area through which the membrane contacts the short-circuit protrusion when the membrane is in the deformed state is asymmetrically arranged about the center axis of the short-circuit hole and is offset toward the side from the center axis of the short-circuit hole to correspond to the short-circuit protrusion.

2. The rechargeable battery of claim 1, wherein the short-circuit protrusion is disposed above the short-circuit hole.

3. The rechargeable battery of claim 2, wherein the short-circuit protrusion is arranged to be adjacent to the connection terminal that is inserted into the second terminal.

4. The rechargeable battery of claim 3, wherein the short-circuit protrusion is elongated in an arc shape.

5. The rechargeable battery of claim 3, wherein a cross section of the short-circuit protrusion has a semi-circular shape.

6. The rechargeable battery of claim 5, wherein the short-circuit protrusion has a groove having an arc-shaped cross-section at a bottom surface of the short-circuit protrusion.

7. The rechargeable battery of claim 2, wherein the short-circuit protrusion is arranged between the center axis of the short-circuit hole and the connection terminal that is inserted into the second terminal.

8. The rechargeable battery of claim 7, wherein the short-circuit protrusion protrudes from a bottom surface of the second terminal.

9. The rechargeable battery of claim 7, wherein the short-circuit protrusion includes an inclined portion slantedly formed at a lower end of the short-circuit protrusion.

10. The rechargeable battery of claim 7, further comprising a connection plate under the second terminal, and the short-circuit protrusion protrudes from the connection plate.

11. The rechargeable battery of claim 10, wherein the connection plate comprises a cylindrical portion protruding toward the membrane and having a tubular shape, and the short-circuit protrusion protrudes from a lower end of the cylindrical portion.

12. The rechargeable battery of claim 11, further comprising a cap inserted into the cylindrical portion.

13. The rechargeable battery of claim 10, further comprising an upper insulating member between the connection plate and the cap plate, and the upper insulating member encloses sides of the connection plate.

* * * * *